April 22, 1958     R. E. SCHLEGEL     2,831,229
LINE TIE
Filed Jan. 6, 1955
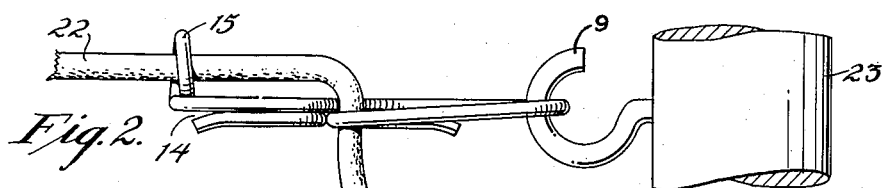
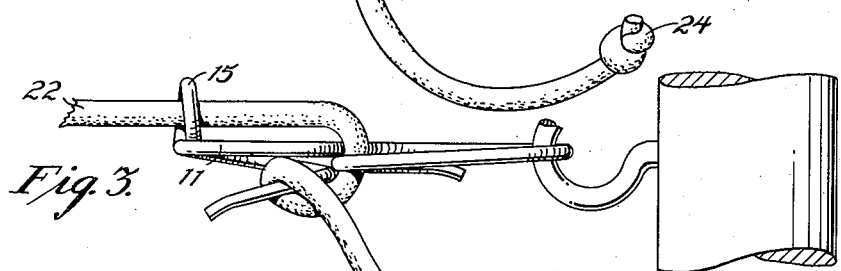
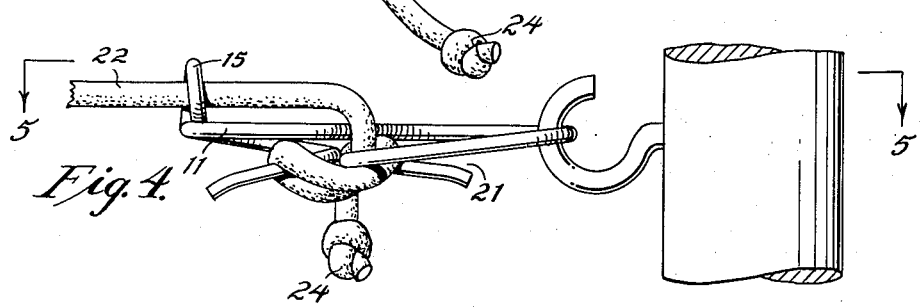
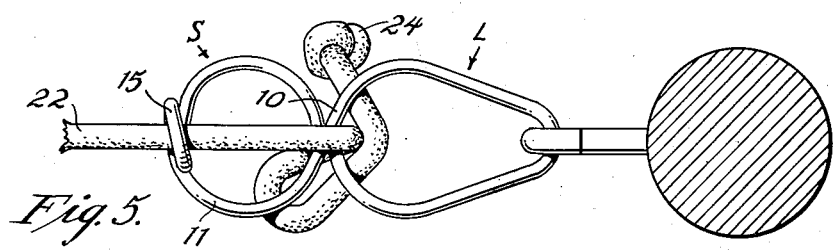
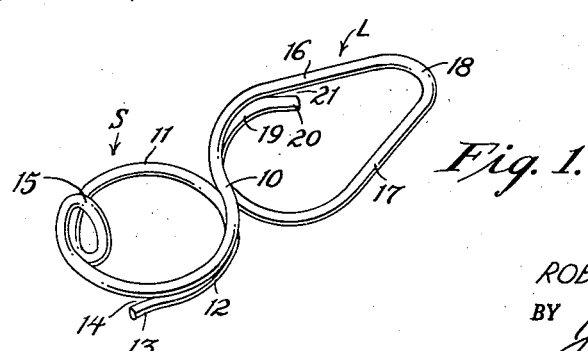
INVENTOR.
ROBERT E. SCHLEGEL
BY
ATTORNEY.

United States Patent Office 2,831,229
Patented Apr. 22, 1958

2,831,229

LINE TIE

Robert E. Schlegel, Philadelphia, Pa.

Application January 6, 1955, Serial No. 480,204

1 Claim. (Cl. 24—131)

The present invention relates to a line tie of the type commonly employed in securing one end of a clothesline to a suitable anchorage, such as a hook on a post, and is concerned primarily with the provision of a novel device which facilitates the tightening of the line and the securing of the connection.

A line tie, of the type with which this invention is concerned, is commonly used in conjunction with clotheslines, lines that are used in securing loads on trucks, lines used in anchoring boats, tent lines, tarpaulin lines and the anchoring lines for tennis and volley ball nets as well as for other purposes. In each case a line must be secured under a required degree of tension and this invention has in view as its primary objective the provision of a line tie which facilitates the tensioning of the line and at the same time affords such a secure connection that definite assurance is had that the line will remain taut. More in detail this invention has as an object the provision of a line tie of the character above indicated, which consists essentially of two parts or sides which are integrally joined by an S-shaped portion and which are made from a single piece of tempered wire. One side or part partakes of the character of a coil spring having one and one-half turns and which is formed at its free end with an eye into which a line is adapted to pass. The second side or part is of oval shape and constitutes the hook or anchorage connection. It also includes at one place two overlapping turns between which a line is adapted to be inserted.

An important object of the invention is to provide a line tie of the character indicated, which includes means for securing the tie in position on a line at all times even during periods of non-use so as to prevent loss of the tie. This end is accomplished by the eye of the tie aforesaid because after the end of a line has been passed therethrough and a knot tied therein the line and tie are assembled to prevent removal of the tie from the line. Moreover, the knot at the end of the line is available as a hand grip in applying tension to the line. The eye serves the further purpose of controlling the direction of the line as it passes through and over the bends joining the two parts of the tie.

Still another highly important object of the invention is to provide a line tie, in which the tension on the line itself serves to further secure the connection between the line and the tie. In the device of this invention the line, after passing through the eye and over the S-shaped portion between the two parts, is inserted first between the two turns of the coil spring and then between the two turns of the anchoring loop. Thus, tension on the line serves to tighten the bends and thus tighten the grip of the coil spring and the loop on the line. Thus, the greater the tension the greater the securing effect.

In most instances a clothesline is located overhead with respect to a person using the same. Thus a line tie which permits of a downward pull for tightening purposes is more easily used.

A further advantage of the line tie of this invention is that the anchoring loop is left substantially free and unrestricted because the line is located only at the bends and the turns immediately adjacent thereto. Moreover, the device is of such a character that it can be readily used by a one-armed person.

For a full and more complete understanding of the invention reference may be had to the following description and accompanying drawing wherein:

Figure 1 is a perspective view of a line tie in accordance with the precepts of this invention.

Figure 2 is a view in side elevation showing the first step in using the tie.

Figure 3 is a similar view showing the second step.

Figure 4 is still another view in side elevation showing the final step; and

Figure 5 is a top plan view depicting the connection as completed.

Referring now to the drawing wherein like reference characters denote corresponding parts and first more particularly to Figure 1, it will be understood that the line tie of this invention is fashioned from a single piece of tempered wire. Due to the nature of the tie, it has been found that a comparatively light wire may be used. The tie comprises a coil spring which is referred to in its entirety by the reference character S and an anchoring loop which is designated L. The loop L and spring S are joined by an S-shaped portion 10. The loop S comprises one full turn 11 and a partial turn 12 with the end portion 13 of the latter diverging from the top turn 11 to provide a flared mouth at 14 for facilitating insertion of the line between the turns 11 and 12.

At the side remote from the S-shaped portion 10 the turn 11 is formed with an eye 15.

The anchoring loop L comprises side parts 16 and 17 which are integrally joined by a bend 18 together with a bottom turn 19 which has an end portion at 20 that diverges from the top side 16 of the loop to leave an open mouth at 21.

The manner of using the line tie of this invention will be described in connection with a clothesline, such as represented at 22 in Figures 2 to 5 inclusive. A post is shown at 23 as carrying a hook 9. The line 22 is passed through the eye 15 after which a knot, such as shown at 24, is formed in the end thereof. The line is then passed over the S-shaped portion 10 and downwardly. In this position the knot 24 constitutes a convenient stop for a hand grip for applying a downward pull on the line and thus achieving a required tension therein. After this tension has been developed the line is passed back beneath the tie towards the eye 15 and then inserted in the mouth 14 as shown in Fig. 3. As the line is pulled into this mouth it spreads the turns of the coil spring and this action is continued to the maximum degree possible. The line is then continued forwardly towards the hook 9 and swung around so that it is inserted through the mouth 21 as shown in Fig. 4. The pull on the line is then back toward the eye and the insertion is continued to the maximum degree possible. This completes the connection. In this position it will be noted that any tension on the line 22 serves to urge the S-shaped portion 10 towards the turn 12 of the spring S and the turn 19 of the loop L. Thus, the greater the tension, the tighter the line is gripped by the two parts of the tie.

While a preferred specific embodiment of the invention is hereinbefore set forth, it is to be clearly understood that the invention is not to be limited to the exact constructions, mechanisms and designs illustrated and described because various modifications of these details may be provided in putting the invention into practice within the purview of the appended claim.

What is claimed is:

In a line tie, a coil spring, an anchoring loop, an S-shaped portion integrally joining said spring and loop and providing an overlapping portion in each of said spring and loop at the juncture of the spring and loop and the area immediately adjacent thereto, and an upright eye perpendicular to said spring and integrally formed therein at the point most remote from said S-shaped portion and in confronting relation thereto, whereby said S-shaped portion is adapted to exert pressure upon a line between said S-shaped portion and that part of the spring which it overlaps by another portion of the line that passes through said eye and over said S-shaped portion.

References Cited in the file of this patent

UNITED STATES PATENTS

| | | |
|---|---|---|
| 362,349 | Alderson | May 3, 1887 |
| 449,072 | Gillis | Mar. 24, 1891 |
| 782,657 | Hubert | Feb. 14, 1905 |
| 879,232 | Young | Feb. 18, 1908 |
| 1,281,958 | Higgins | Oct. 15, 1918 |
| 1,495,912 | Liefer | May 27, 1924 |
| 2,169,530 | Hubert | Aug. 15, 1939 |